(12) United States Patent
Morishita et al.

(10) Patent No.: US 11,437,875 B2
(45) Date of Patent: Sep. 6, 2022

(54) MOTOR SHAFT, ROTOR, MOTOR AND BLOWER

(71) Applicant: Panasonic Intellectual Property Management Co., Ltd., Osaka (JP)

(72) Inventors: Motohiro Morishita, Aichi (JP); Satoru Murao, Aichi (JP); Munetada Satou, Aichi (JP); Ryutaro Ishida, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 133 days.

(21) Appl. No.: 16/981,040

(22) PCT Filed: Mar. 27, 2019

(86) PCT No.: PCT/JP2019/013148
§ 371 (c)(1),
(2) Date: Sep. 15, 2020

(87) PCT Pub. No.: WO2019/189339
PCT Pub. Date: Oct. 3, 2019

(65) Prior Publication Data
US 2021/0111600 A1  Apr. 15, 2021

(30) Foreign Application Priority Data

Mar. 28, 2018 (JP) .............................. JP2018-061512
Nov. 19, 2018 (JP) .............................. JP2018-216229
Nov. 19, 2018 (JP) .............................. JP2018-216230

(51) Int. Cl.
*H02K 1/28* (2006.01)
*H02K 1/2713* (2022.01)
(Continued)

(52) U.S. Cl.
CPC ......... *H02K 1/2713* (2013.01); *H02K 1/2733* (2013.01); *H02K 1/28* (2013.01); *H02K 7/06* (2013.01)

(58) Field of Classification Search
CPC ............ H02K 1/27; H02K 1/28; H02K 15/03; H02K 1/24; H02K 5/16
See application file for complete search history.

(56) References Cited

U.S. PATENT DOCUMENTS 4,748,354 A * 5/1988 Toshima ................ H02K 1/325
310/60 A
2002/0047428 A1 4/2002 Schlenker
(Continued)

FOREIGN PATENT DOCUMENTS

EP 2945260 A2 * 11/2015 ............. H02K 1/246
JP H04-071351 A 3/1992
(Continued)

OTHER PUBLICATIONS

Machine Translation of EP 2945260 A2 (Year: 2015).*
International Search Report for corresponding Application No. PCT/JP2019/013148, dated Jun. 18, 2019.

*Primary Examiner* — Quyen P Leung
*Assistant Examiner* — Christopher S Leone
(74) *Attorney, Agent, or Firm* — Renner, Otto, Boisselle & Sklar, LLP

(57) ABSTRACT

A cylindrically-shaped motor shaft forming a rotational axis of a motor includes a processing target region, a spiral groove, and a reverse spiral groove intersecting with the spiral groove at at least one point. The processing target region has a first end closer to a bottom face of the cylindrical shape and second end closer to a top face side of the cylindrical shape. At least one turn of the spiral groove surrounds an outer circumferential surface in the processing target region. The reverse spiral groove surrounds the outer
(Continued)

circumferential surface in the processing target region in a direction reverse to that of the spiral groove.

15 Claims, 7 Drawing Sheets

(51) Int. Cl.
  *H02K 1/2733* (2022.01)
  *H02K 7/06* (2006.01)

(56) References Cited

U.S. PATENT DOCUMENTS

| | | | |
|---|---|---|---|
| 2004/0046466 A1* | 3/2004 | Siess | H02K 15/14 |
| | | | 310/43 |
| 2007/0052310 A1* | 3/2007 | Sakai | F04D 13/064 |
| | | | 310/43 |
| 2013/0285482 A1* | 10/2013 | Yamamoto | H02K 1/04 |
| | | | 310/43 |
| 2020/0153298 A1* | 5/2020 | Takahashi | H02K 7/003 |
| 2022/0052578 A1* | 2/2022 | Cross | H02K 1/32 |

FOREIGN PATENT DOCUMENTS

| | | |
|---|---|---|
| JP | H04-347549 A | 12/1992 |
| JP | H06-070479 U | 9/1994 |
| JP | H09-093842 A | 4/1997 |
| JP | 2001-314067 A | 11/2001 |
| JP | 2002-101583 A | 4/2002 |
| JP | 2004-514387 A | 5/2004 |
| JP | 2005-020974 A | 1/2005 |
| JP | 2013-106360 A | 5/2013 |

* cited by examiner

MOTOR SHAFT, ROTOR, MOTOR AND BLOWER

TECHNICAL FIELD

The present disclosure relates to a motor shaft, a rotor including the motor shaft, a motor, and a blower.

BACKGROUND ART

There has been conventionally known a knurled portion of a motor shaft, the knurled portion being a portion processed to have a diamond pattern (for example, see Patent Literature 1).

Hereinafter, the diamond knurled portion will be described with reference to FIG. 8A.

FIG. 8A is an enlarged view of diamond knurled portion 102 formed in motor shaft 101. When a plastic magnet is formed on a knurled portion (diamond knurled portion 102) in the circumference of motor shaft 101, friction between motor shaft 101 and the plastic magnet in the axial direction and the circumferential direction of motor shaft 101 increases. Thus, motor shaft 101 and the plastic magnet are fixed firmly. Note that diamond knurled portion 102 is formed by rolling processing.

As another knurled portion example, there is a knurled portion processed to have a parallel-lines pattern (for example, see Patent Literature 2).

Hereinafter, a parallel-lines knurled portion will be described with reference to FIG. 8B.

FIG. 8B is an enlarged view of parallel-lines knurled portion 103 formed in motor shaft 101. As is the case with diamond knurled portion 102, when parallel-lines knurled portion 103 is provided, friction between motor shaft 101 and the plastic magnet in the axial direction and the circumferential direction of motor shaft 101 is caused. Thus, motor shaft 101 and the plastic magnet are fixed firmly. Note that, as is the case with diamond knurled portion 102, parallel-lines knurled portion 103 is formed by rolling processing.

CITATION LIST

Patent Literature 1: Unexamined Japanese Patent Publication No. 2002-101583
Patent Literature 2: Unexamined Japanese Patent Publication No. 2005-20974

SUMMARY OF INVENTION

For the manufacture of such conventional motor shaft 101, cutting processing, polishing processing, and rolling processing are used in a processing procedure. For example, in the cutting processing, for example, portions of motor shaft 101, other than a knurled portion are cut. Next, in the polishing processing, motor shaft 101 is polished. Finally, in the rolling processing, the knurled portion is formed.

Here, the rolling processing is such processing that, by applying a pressure from a side of the motor shaft toward the center, processing to make the motor shaft depressed to the central axial direction and processing to make the circumference of the resulting depressed portion projected in a direction opposite to the central axial direction are simultaneously performed. In other words, the rolling processing is a metal-processing method to deform a material by applying a large force to the material. When a portion is processed using this method, a projection is formed in the circumference of the resulting processed portion. FIG. 9A is a diagram illustrating a state in which an object is subjected to the cutting processing to be V-shaped toward the upper side from the lower side of the figure. FIG. 9B is a diagram illustrating a state in which an object is subjected to the rolling processing to be V-shaped toward the upper side from the lower side of the figure. In the cutting processing, the object is processed without the generation of a portion protruding out of outer circumferential surface 112 of the object when processed groove 111 is formed. In contrast, in the rolling processing, the object is deformed by the application of a pressure thereto, and accordingly, a portion protruding downward out of outer circumferential surface 112, that is, projection 113 is generated when processed groove 111 is formed. This is a difference between a shape formed through the cutting processing and a shape formed through the rolling processing.

In the above-described processing procedure, different types of the processing require different types of equipment, and furthermore, the motor shaft needs to be moved for every processing equipment. Hence, the processing procedure has a problem that equipment cost is entailed and time cost is also entailed with the movement of the motor shaft.

Hence, an object of the present disclosure is to provide a motor shaft exhibiting sufficient friction in the axial direction and the circumferential direction and capable of reducing equipment cost and time cost.

To achieve the above-mentioned object, a motor shaft according to one embodiment of the present disclosure is a motor shaft that has a cylindrical shape and forms a rotational axis of a motor, the motor shaft including a processing target region, a spiral groove, and a reverse spiral groove. The processing target region has a first end closer to the bottom face of the cylindrical shape and a second end closer to the top face of the cylindrical shape. At least one turn of the spiral groove surrounds the outer circumferential surface of the cylindrical shape between the first end and the second end. The reverse spiral groove surrounds the outer circumferential surface in the processing target region in a direction reverse to a direction of the spiral groove, the reverse spiral groove intersects with the spiral groove at at least one point.

A motor shaft according to another embodiment of the present disclosure is a motor shaft that has a cylindrical shape and forms a rotational axis of a motor, the motor shaft including a processing target region, a spiral groove, and at least one of a first-end circular groove and a second-end circular groove. The processing target region has a first end closer to the bottom face of the cylindrical shape and a second end closer to the top face of the cylindrical shape. At least one turn of the spiral groove surrounds the outer circumferential surface of the cylindrical shape between the first end and the second end. The first-end circular groove is provided at the first end and surrounds the outer circumferential surface. The second-end circular groove is provided at the second end, and surrounds the outer circumferential surface.

The present disclosure can provide a motor shaft exhibiting sufficient friction in the axial direction and the circumferential direction of the motor shaft and capable of reducing equipment cost and time cost.

DESCRIPTION OF EMBODIMENTS

Figure 1:
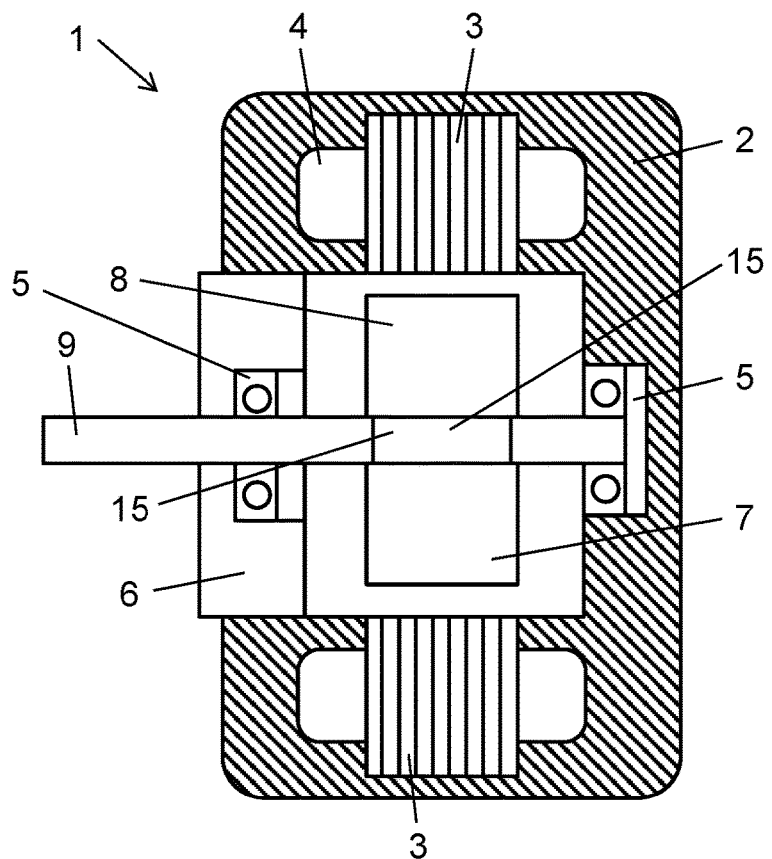
FIG. 1 is a cross-sectional diagram schematically illustrating an internal configuration of a motor according to Embodiment 1 of the present disclosure.

Hereinafter, embodiments of the present disclosure will be described with reference to the drawings. Note that the following embodiments are merely specific examples of the present disclosure, and do not limit the technical scope of the present disclosure. In all of the drawings, the same constituent elements are given the same reference numeral, and the repetition of the same description thereof is avoided. Furthermore, in each of the drawings, detailed descriptions of constituent elements that are not directly related to the present disclosure are omitted.

Embodiment 1

A blower, a motor, a rotor, and a motor shaft according to Embodiment 1 of the present disclosure will be described with reference to FIG. 1. FIG. 1 is a cross-sectional diagram schematically illustrating an internal configuration of the motor.

Motor 1 is an inner-rotor DC motor, and is used as a driving source of the blower by, for example, rotating motor shaft 9 provided with an impeller.

Motor 1 includes molded body 2, bracket 6, and rotor 7.

Molded body 2 is made from resin and has a cylindrical shape with a bottom, and includes stators 3 and windings 4 thereinside. Molded body 2 accommodates rotor 7 in an interior space formed in a recessed shape. That is, molded body 2 constitutes an outer frame of motor 1.

Bracket 6 is disposed to cover an opening of the recessed space of motor 1.

Rotor 7 is disposed rotatably by bearings 5 provided at two points on a bracket 6 side and a bottom face side of molded body 2. Rotor 7 includes motor shaft 9 and plastic magnet 8.

Motor shaft 9 has a cylindrical bar shape and includes knurled portion 15.

Knurled portion 15 is provided in a surface of motor shaft 9 at a position corresponding to stators 3, that is, in FIG. 1, at a position sandwiched by stators 3 illustrated in the upper and lower parts of the figure. Note that details of motor shaft 9 and knurled portion 15 will be described later.

Plastic magnet 8 has a hollow cylindrical shape, and can be formed using a plastic magnet as a material. Plastic magnet 8 is provided in the circumference of knurled portion 15. Plastic magnet 8 can be integrated with motor shaft 9 by pouring molten plastic magnet 8 into a mold positioned on knurled portion 15 and solidifying plastic magnet 8. In the present embodiment, both ends in the axial direction of plastic magnet 8 in the state of being integral with motor shaft 9 are positioned outside knurled portion 15.

During the driving of motor 1, motor shaft 9 serves as a rotational axis and rotor 7 rotates.

Figure 2:
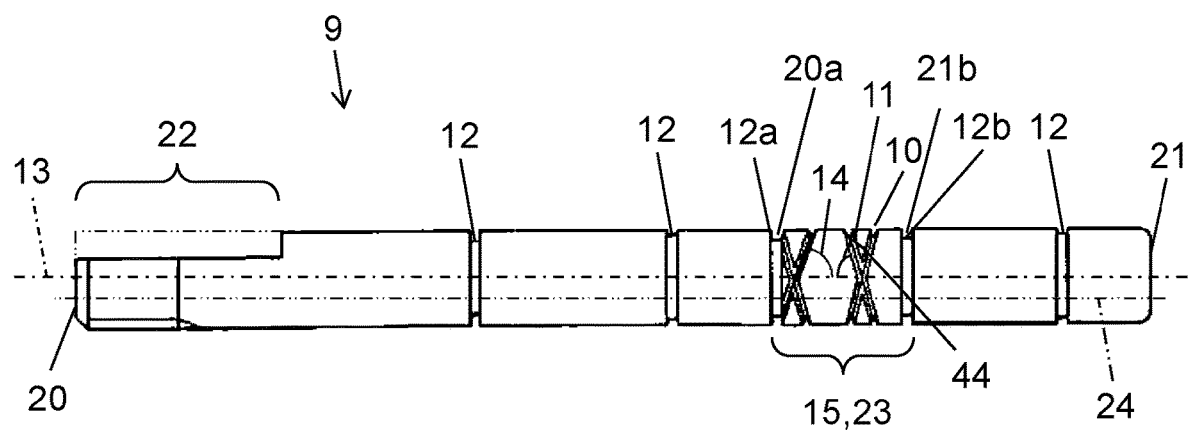
FIG. 2 is a side view of a motor shaft according to Embodiment 1.

Subsequently, details of motor shaft 9 will be described with reference to FIG. 2. FIG. 2 is a side view of the motor shaft according to Embodiment 1.

Motor shaft 9 has a cylindrical shape, and includes rotational axis 13 passing from the center of circular bottom face 20 of the cylindrical shape through the center of circular top face 21 of the cylindrical shape. Note that, while motor shaft 9 has the cylindrical shape, motor shaft 9 is provided, on a bottom face 20 side, with notch 22 for mounting an impeller of a blower.

Moreover, a plurality of circular grooves 12 is established in the outer circumferential surface of the motor shaft 9. That is, bottom face 20 is not strictly circular due to notch 22, but is expressed in the word "circular" in order to aid the understanding, and accordingly it can be said that motor shaft 9 has an approximately cylindrical shape.

Circular grooves 12 are each provided so as to entirely surround the outer circumferential surface of motor shaft 9. Circular grooves 12 and notch 22 can be formed by cutting processing. Each of circular grooves 12 is connected to a retaining ring (an E-shaped ring) used for the fixation of a bearing to motor shaft 9.

Motor shaft 9 includes processing target region 23, spiral groove 10, and reverse spiral groove 11.

Processing target region 23 is provided from first end 20a on the bottom face 20 side of the cylindrical shape of motor shaft 9 to second end 21b on the top face 21 side of the cylindrical shape.

Processing target region 23 is in the outer circumferential surface of motor shaft 9, and includes a region in which plastic magnet 8 is disposed. In the present embodiment, as illustrated in FIG. 1, in a state in which motor shaft 9 and plastic magnet 8 are integrated, both ends in the axial direction of plastic magnet 8 protrude outside both ends of processing target region 23. Note that both the ends of processing target region 23 do not necessarily protrude out of the both ends of plastic magnet 8. First end 20a and second end 21b of processing target region 23 may be positioned at both ends on the bottom face side and the top face side of plastic magnet 8. Furthermore, first end 20a and second end 21b of processing target region 23 may be provided outside both the ends of plastic magnet 8.

Here, out of portions of circular groove 12, a portion of circular groove 12 provided at first end 20a on the bottom face 20 side of processing target region 23 is referred to as first-end circular groove 12a. A portion of circular groove 12 provided at second end 21b on the top face 21 side of processing target region 23 is referred to as second-end circular groove 12b. First-end circular groove 12a and second-end circular groove 12b are made use of not for connection to the retaining ring, but for fixing plastic magnet 8 to motor shaft 9. That is, first-end circular groove 12a and second-end circular groove 12b are equivalent to knurled portion 15.

In processing target region 23, spiral groove 10 and reverse spiral groove 11 are provided between first end 20a and second end 21b.

In processing target region 23, at least one turn of spiral groove 10 surrounds the outer circumferential surface of motor shaft 9. Here, the expression "at least one turn of spiral groove 10 surrounds the outer circumferential surface" means that, between first-end circular groove 12a and second-end circular groove 12b that respectively constitute both ends of processing target region 23, a line segment from one end of spiral groove 10 to another end of spiral groove 10 intersects at least one time with an imaginary line (for example, imaginary line 24) provided in parallel to rotational axis 13 in the outer circumferential surface of motor shaft 9. Furthermore, the one end of spiral groove 10 is continuous with first-end circular groove 12a, while the other end of spiral groove 10 is continuous with second-end circular groove 12b. Spiral groove 10 forms a predetermined angle (spiral groove angle 14) with respect to rotational axis 13, in the present embodiment, approximately 60 degrees, which is larger than 45 degrees.

Reverse spiral groove 11 is provided in processing target region 23 so as to surround the cylindrically-shaped outer circumferential surface of motor shaft 9 in a direction reverse to the direction of spiral groove 10. Note that reverse spiral groove 11 is not necessarily provided across both ends of processing target region 23, in other words, from first-end circular groove 12a to second-end circular groove 12b. Furthermore, reverse spiral groove 11 does not necessarily entirely surround the outer circumferential surface of motor shaft 9, and is beneficial to intersect with spiral groove 10 at at least one point. Note that, in the present embodiment, one end of reverse spiral groove 11 is continuous with first-end circular groove 12a, while another end of reverse spiral groove 11 is continuous with second-end circular groove 12b. Reverse spiral groove 11 forms a predetermined angle (reverse spiral groove angle 41) with respect to rotational axis 13, in the present embodiment, approximately 60 degrees, which is larger than 45 degrees.

Spiral groove 10 and reverse spiral groove 11 form approximately 60 degrees in opposite directions with respect to rotational axis 13. In other words, spiral groove 10 and reverse spiral groove 11 form an intersecting angle of approximately 120 degrees as an obtuse angle and approximately 60 degrees as an acute angle.

Whether or not the one end of spiral groove 10 or reverse spiral groove 11 is continuous with first-end circular groove 12a and whether or not the other end of spiral groove 10 or reverse spiral groove 11 is continuous with second-end circular groove 12b are arbitrarily determined, depending on time required for a manufacturing process and the strength of friction required of a load connected to motor 1.

Here, spiral groove 10 and reverse spiral groove 11 are grooves formed by cutting processing, and are different from a groove formed by rolling processing. Therefore, motor shaft 9 does not further rise radially from a surface, that is, the outer circumferential surface.

With the above-described configuration, friction in the axial direction (horizontal direction) and the circumferential direction (rotational direction) of the motor shaft 9 is generated between motor shaft 9 and plastic magnet 8. Thus, plastic magnet 8 and motor shaft 9 are held firmly. Note that the axial direction of motor shaft 9 means a direction along rotational axis 13.

Spiral groove 10, reverse spiral groove 11, and circular groove 12 can be produced by giving cutting processing to motor shaft 9. In other words, rolling processing is unnecessary, and accordingly, equipment for rolling processing is unnecessary. As described above, the steps of processing motor shaft 9 individually require equipment. For example, when cutting processing is shifted to polishing processing, motor shaft 9 needs to be transferred from equipment for the cutting processing to equipment for the polishing processing. It is unnecessary for motor shaft 9 to be subjected to the rolling processing, and therefore, motor shaft 9 does not need to be transferred from equipment for the polishing processing to equipment for the rolling processing, and thus, transfer time and processing time are reduced, so that productivity is enhanced. In other words, spiral groove 10 and reverse spiral groove 11 can be produced only by the cutting processing and therefore does not need to be subjected to the rolling processing, so that equipment cost and time cost can be reduced.

In FIG. 2, one spiral groove 10 and one reverse spiral groove 11 are provided. However, a plurality of spiral grooves 10 and a plurality of reverse spiral grooves 11 may be provided in processing target region 23. Specifically, a plurality of spiral grooves 10 and one reverse spiral groove 11 may be provided, or alternatively one spiral groove 10 and a plurality of reverse spiral grooves 11 may be provided.

The above-described configuration allows the groove area of processing target region 23 to be increased without changing the processing widths of spiral groove 10 and reverse spiral groove 11 or without making spiral groove angle 14 larger.

Thus, processing time is not increased, and, with an increase in the groove area, friction in the axial direction and the circumferential direction between motor shaft 9 and plastic magnet 8 is increased. Thus, the holding power of motor shaft 9 for plastic magnet 8 is enhanced.

Embodiment 2

Figure 3A:
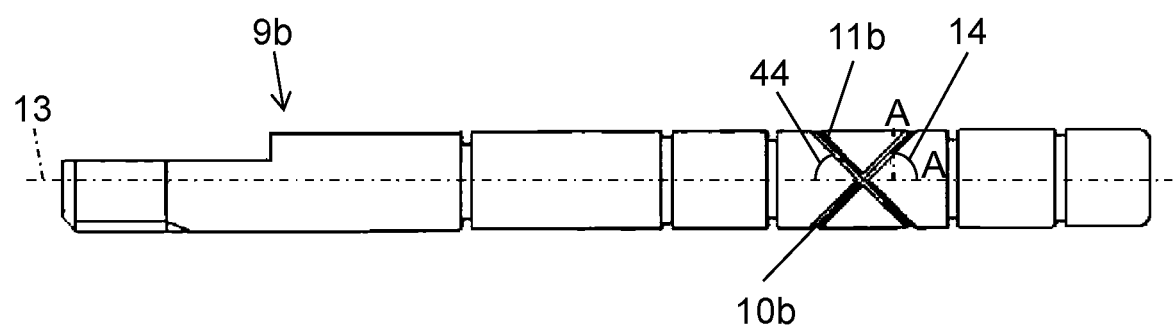
FIG. 3A is a side view of a motor shaft according to Embodiment 2.
Figure 3B:
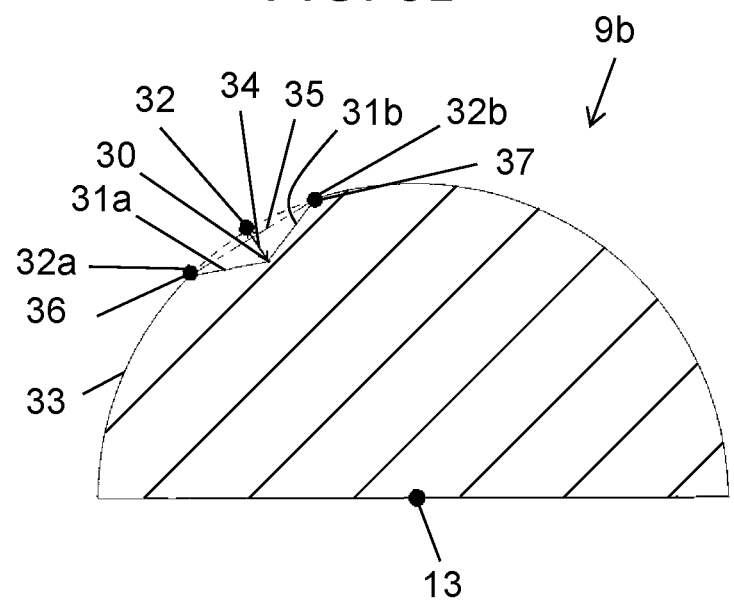
FIG. 3B is a cross-sectional diagram of the motor shaft according to Embodiment 2.

Next, motor shaft 9b according to Embodiment 2 will be described with reference to FIG. 3A and FIG. 3B. FIG. 3A is a side view of motor shaft 9b according to Embodiment 2. FIG. 3B is a cross-sectional diagram of motor shaft 9b according to Embodiment 2. Note that FIG. 3B is a cross-sectional diagram taken along line A-A in FIG. 3A.

Motor shaft 9b includes spiral groove 10b and reverse spiral groove 11b.

As illustrated in FIG. 3A, spiral groove angle 14 is 45 degrees, and reverse spiral groove angle 44 is also 45 degrees. In other words, spiral groove 10b forms an angle of 45 degrees with rotational axis 13, and reverse spiral groove angle 11b forms an angle of 45 degrees with rotational axis 13. That is, spiral groove 10b and reverse spiral groove 11b intersect with each other at an angle of 90 degrees.

As illustrated in FIG. 3B, both spiral groove 10b and reverse spiral groove 11b have a V-shaped groove shape being such that groove center 30 is the closest to rotational axis 13 of motor shaft 9b, in other words, the circle center of a cylindrical shape of motor shaft 9b. That is, left inner wall 31a and right inner wall 31b are formed through the cutting processing, and have the same length. With the above-described configuration, the edge shape of a portion at which spiral groove 10b and reverse spiral groove 11b intersect is relaxed, and accordingly, the generation of a burr and cutting refuse during the cutting processing is reduced.

Figure 9A:
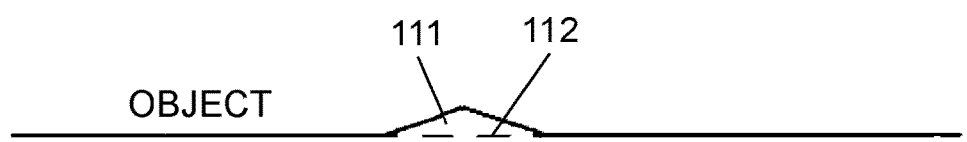
FIG. 9A is a diagram illustrating a conventional cutting-processed portion.
Figure 9B:
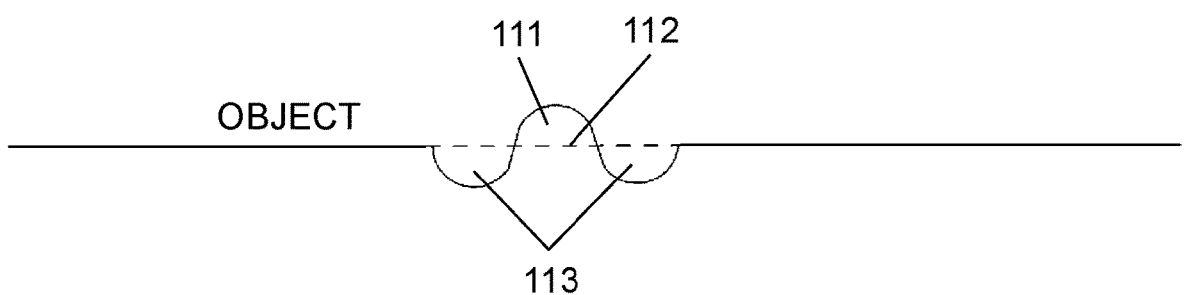
FIG. 9B is a diagram illustrating a conventional rolling-processed portion.

Both spiral groove 10b and reverse spiral groove 11b are cut grooves, and therefore, unlike projection 113 illustrated in FIG. 9B according to the prior art, uppermost portions 32, 32a, and 32b being radially most distant from rotational axis 13 of motor shaft 9b are in agreement with outer circumferential surface 33 of motor shaft 9b.

Spiral groove 10b and reverse spiral groove 11b are cut grooves in which groove depth 34 is less than groove width 35. Here, groove depth 34 means a length from groove center 30 to uppermost portion 32. Groove width 35 means the length of a line segment linearly joining edge 36 at which left inner wall 31a is in contact with outer circumferential surface 33 and edge 37 at which right inner wall 31b is in contact with outer circumferential surface 33.

With the above-described configuration, plastic magnet 8 integrally molded with motor shaft 9b at portions of spiral groove 10b and reverse spiral groove 11b has increased holding strength (adhesion strength) in a direction along outer circumferential surface 33 of motor shaft 9b. Thus, friction in the horizontal direction and the rotational direction of rotational axis 13 between motor shaft 9b and plastic magnet 8 is increased, whereby the holding power is increased.

Embodiment 3

Figure 4A:
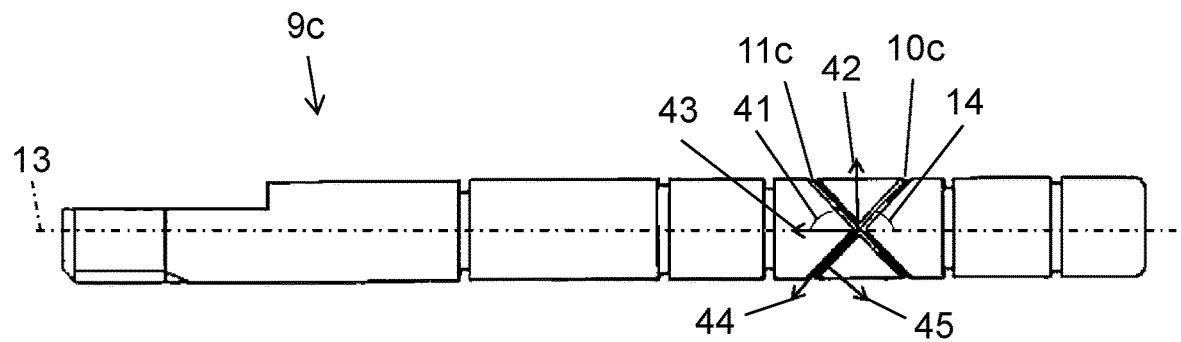
FIG. 4A is a side view of a motor shaft for illustrating angles of a spiral groove and a reverse spiral groove with respect to the motor shaft.
Figure 4B:
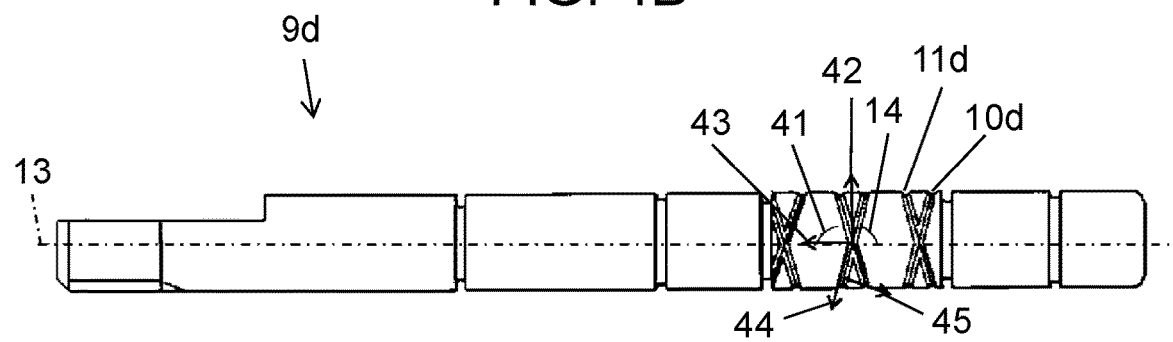
FIG. 4B is a side view of a motor shaft for illustrating angles of a spiral groove and a reverse spiral groove with respect to the motor shaft.
Figure 4C:
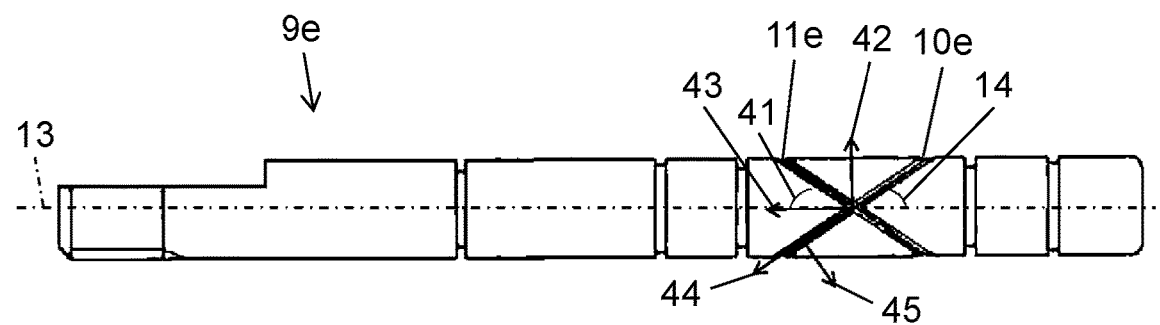
FIG. 4C is a side view of a motor shaft for illustrating angles of a spiral groove and a reverse spiral groove with respect to the motor shaft.

Next, configuration examples of spiral grooves and reverse spiral grooves will be described with reference to FIG. 4A, FIG. 4B, and FIG. 4C. FIG. 4A, FIG. 4B, and FIG. 4C are side views of motor shafts for illustrating angles of the spiral grooves and the reverse spiral grooves with respect to motor shafts 9c, 9d, and 9e according to Embodiment 3, respectively.

FIG. 4A is a diagram illustrating a state in which (as is the case with Embodiment 2) both an angle formed by spiral groove 10c and rotational axis 13, that is, spiral groove angle 14, and an angle formed by reverse spiral groove 11c and rotational axis 13, that is, reverse spiral groove angle 41 are 45 degrees.

With the above-described configuration, when stress in rotational direction 42 (a tangent direction at a predetermined point in outer circumferential surface 33) or axial direction 43 is imposed on rotor 7, the stress is distributed equally in groove direction 44 and groove vertical direction 45. Thus, the balance of the holding power in rotational direction 42 and the holding power in axial direction 43 that act between motor shaft 9c and plastic magnet 8 is kept.

FIG. 4B is a diagram illustrating a state in which spiral groove angle 14 and reverse spiral groove angle 41 are each larger than 45 degrees.

With the above-described configuration, when stress in rotational direction 42 is imposed, much of the stress is distributed in groove direction 44. Thus, holding power acting between motor shaft 9d and plastic magnet 8 against the stress in rotational direction 42 is smaller. In contrast, when stress in axial direction 43 is imposed, much of the stress is distributed in groove vertical direction 45. Here, spiral groove 10d and reverse spiral groove 11d are each provided so as to form an angle larger than 45 degrees with axial direction 43. Thus, holding power acting between motor shaft 9d and plastic magnet 8 is less sensitive to stress in axial direction 43. Note that, when spiral groove angle 14 and reverse spiral groove angle 41 are each larger than 45 degrees and furthermore spiral groove angle 14 and reverse spiral groove angle 41 increase, the holding power acting between motor shaft 9d and plastic magnet 8 is less sensitive to stress in axial direction 43. In other words, the configuration of motor shaft 9d is effective when an impeller or the like on which severe stress in axial direction 43 is imposed is mounted.

FIG. 4C is a diagram illustrating a state in which spiral groove angle 14 and reverse spiral groove angle 41 are each smaller than 45 degrees.

With the above-described configuration, when stress in axial direction 43 is imposed, much of the stress is distributed in groove direction 44. Thus, holding power acting between motor shaft 9e and plastic magnet 8 against the stress in axial direction 43 is smaller. In contrast, when stress in rotational direction 42 is imposed, much of the stress is distributed in groove vertical direction 45. Here, spiral groove 10e and reverse spiral groove 11e are each provided so as to form an angle larger than 45 degrees with rotational direction 42. Thus, holding power acting between motor shaft 9e and plastic magnet 8 is less sensitive to stress in rotational direction 42. Note that, when spiral groove angle 14 and reverse spiral groove angle 41 are each smaller than 45 degrees and furthermore spiral groove angle 14 and reverse spiral groove angle 41 decrease, the holding power acting between motor shaft 9e and plastic magnet 8 is less sensitive to stress in rotational direction 42. In other words, the configuration of motor shaft 9e is effective when an impeller or the like on which severe stress in rotational direction 42 is imposed is mounted.

Spiral groove angle 14 and reverse spiral groove angle 41 are not necessarily the same. Spiral groove angle 14 may be 45 degrees or larger and reverse spiral groove angle 41 may be smaller than 45 degrees. Alternatively, spiral groove angle 14 may be 45 degrees or smaller and reverse spiral groove angle 41 may be larger than 45 degrees.

Embodiment 4

Figure 5:
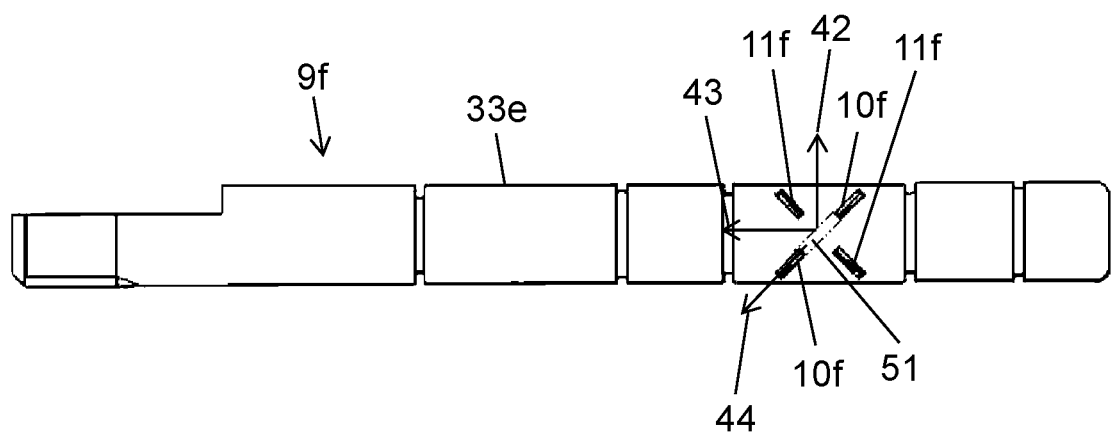
FIG. 5 is a side view of a motor shaft according to Embodiment 4.

Next, motor shaft 9f according to Embodiment 4 will be described with reference to FIG. 5. FIG. 5 is a side view of motor shaft 9f according to Embodiment 4. As illustrated in FIG. 5, spiral groove 10f and reverse spiral groove 11f in motor shaft 9f are each processed so as to allow a predetermined spacing. In other words, each of spiral groove 10f and reverse spiral groove 11f includes wall 51.

In other embodiments, one spiral groove 10 and one reverse spiral groove 11 are each continuous in processing target region 23. However, for example, spiral groove 10f according to the present embodiment includes wall 51 at regular spacings.

Wall 51 is a portion to fill one spiral groove 10f at predetermined spacings. Wall 51 can be formed by changing the distance between a cutter and rotational axis 13 with a fixed cycle, for example, during the cutting processing. At a position at which wall 51 is formed, one face of wall 51, that is, an uppermost portion of wall 51 which is radially most distant from the center of a circle of the cylindrical shape of wall 51 is in agreement with outer circumferential surface 33e of motor shaft 9f.

With the above-described configuration, when stress in rotational direction 42 or axial direction 43 is imposed on rotor 7, the holding power in groove direction 44 can be kept. Furthermore, the intermittent groove processing allows a processed area of a cut groove to be reduced. In other words, holding power in rotational direction 42 of rotational axis 13 of rotor 7 increases, and, although time for the cutting processing of motor shaft 9 does not change, time to touch a cutter to motor shaft 9 during the cutting processing is reduced, and accordingly, the life of the cutter of an apparatus can be increased.

Embodiment 5

Next, a motor shaft according to Embodiment 5 will be described with reference to FIG. 6 and FIG. 7.

Figure 6:
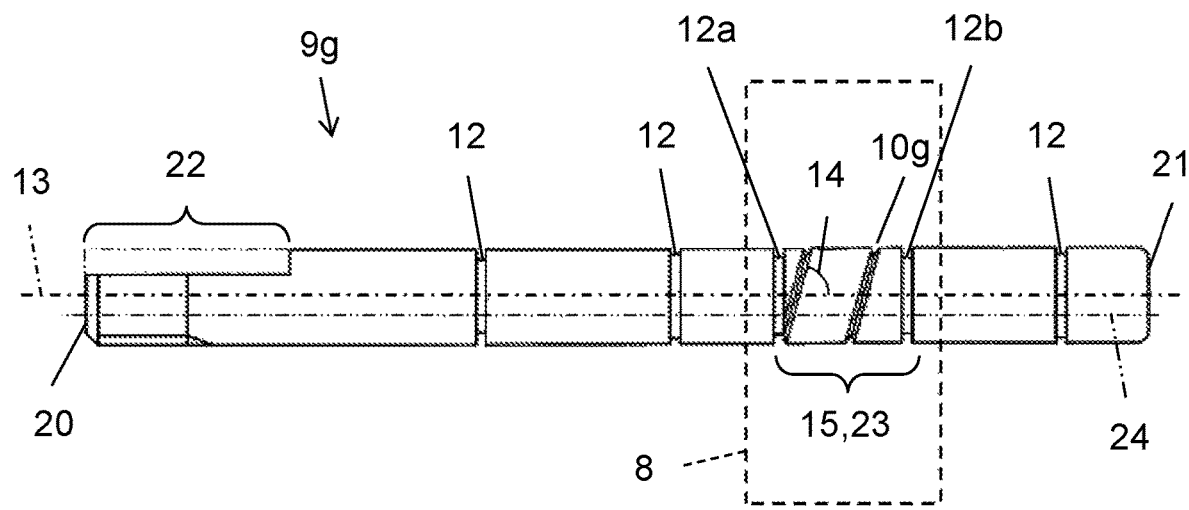
FIG. 6 is a side view of a motor shaft having a spiral groove and circular grooves.

FIG. 6 is a side view of motor shaft 9g according to Embodiment 5. As illustrated in FIG. 6, motor shaft 9g includes processing target region 23, spiral groove 10g, first-end circular groove 12a, and second-end circular groove 12b. In other words, motor shaft 9g does not include reverse spiral groove 11.

Hence, during the rotation of motor shaft 9g, force in the axial direction acts on plastic magnet 8 due to screw action. On the other hand, it is deemed that the absence of spiral groove 11 causes plastic magnet 8 to have insufficient friction in the axial direction and thereby become deviated in the axial direction. However, motor shaft 9g includes first-end circular groove 12a and second-end circular groove 12b. Thus, friction in the axial direction between motor shaft 9g and plastic magnets 8 is secured.

Such configuration does not need the step of forming reverse spiral groove 11, and therefore allows time cost at the time of manufacture to be reduced.

In the above-described configuration, it is beneficial that the radial depth of first-end circular groove 12a and second-end circular groove 12b is made larger (deeper) than that of circular groove 12, as needed. Thus, friction in the axial direction between motor shaft 9g and plastic magnet 8 becomes higher. Furthermore, the strength of plastic magnet 8 can be enhanced, and accordingly, holding power acting between motor shaft 9g and plastic magnet 8 in the horizontal direction and the rotational direction can be secured.

Figure 7:
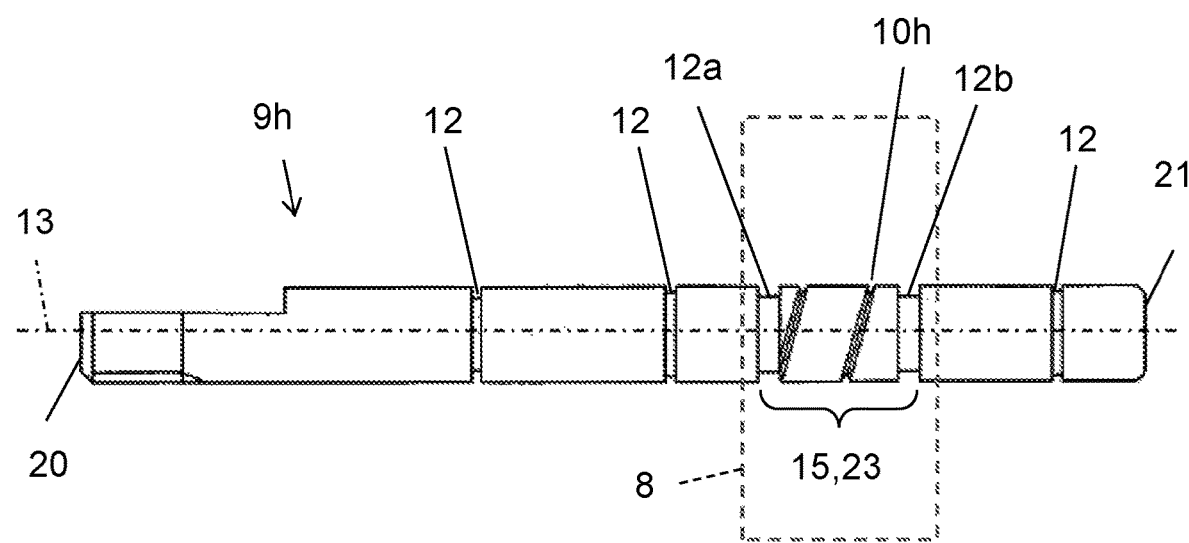
FIG. 7 is a side view of the motor shaft in which the width of circular grooves is wider than the width of a spiral groove.
Figure 8A:
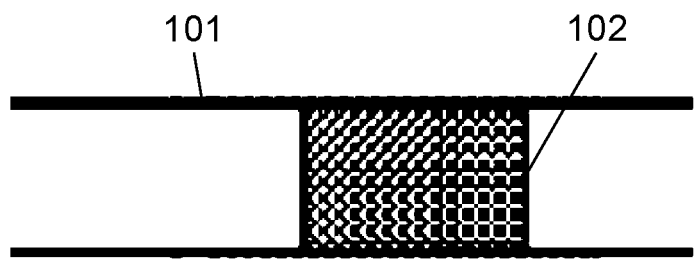
FIG. 8A is an enlarged view of a diamond knurled portion of a conventional motor shaft.
Figure 8B:
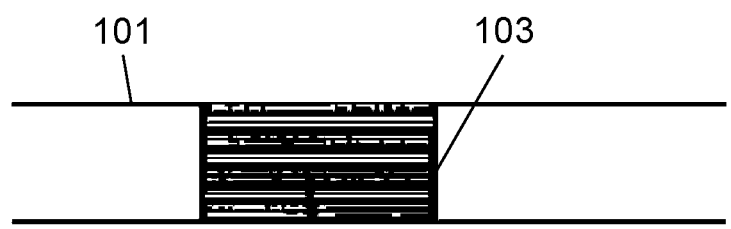
FIG. 8B is an enlarged view of a parallel-lines knurled portion of a conventional motor shaft.

FIG. 7 is a side view of motor shaft 9h according to Embodiment 5.

Motor shaft 9h illustrated in FIG. 7 includes processing target region 23, spiral groove 10, first-end circular groove 12a, and second-end circular groove 12b. The width of at least one of first-end circular groove 12a and second-end circular groove 12b is wider than the width of spiral groove 10h and the width of circular groove 12.

Usually, the width of circular groove 12 is approximately equal to the width (thickness) of a retaining ring. However, it is deemed that, with such width relation, plastic magnet 8 has insufficient strength in the axial direction in some cases. In this case, when the width of at least one of first-end circular groove 12a and second-end circular groove 12b is made wider than the width of circular groove 12, sufficient strength in the axial direction can be given to plastic magnet 8. Furthermore, a contact area of at least one of first-end circular groove 12a and second-end circular groove 12b with plastic magnet 8 increases. Thus, friction between motor shaft 9h and plastic magnet 8 can also increase.

With the number of spiral groove 10h, and spiral groove angle 14, friction in the circumferential direction between motor shaft 9g and plastic magnet 8 varies. Therefore, in order to strike a balance between friction in the circumferential direction and friction in the axial direction, the width of at least one of first-end circular groove 12a and second-end circular groove 12b is made wider than the width of spiral groove 10. In other words, many turns of one spiral groove 10 can be formed around motor shaft 9h, but, only one turn of first-end circular groove 12a or second-end circular groove 12b can be formed around motor shaft 9h. Therefore, in the case where a big difference between friction in the circumferential direction and friction in the axial direction is caused, the magnitude of friction in the axial direction is adjusted by changing the width of at least one of first-end circular groove 12a and second-end circular groove 12b. Thus, frictional force acting between motor shaft 9h and plastic magnet 8 is controlled.

With the above-described configuration, plastic magnet 8 integrally molded with motor shaft 9h at portions of first-end circular groove 12a, second-end circular groove 12b, and spiral groove 10h has enhanced frictional force in the axial direction and enhanced strength in the axial direction. Thus, holding power acting between motor shaft 9h and plastic magnets 8 in the horizontal direction between and the rotational direction increases.

(Modification)

Note that the above-described embodiments can be conducted in combination within a consistent range.

Examples of what falls under the above-mentioned idea include a combination of the angle of a spiral groove and the angle of a reverse spiral groove, a choice between the singular number and the plural number of spiral grooves and reverse spiral grooves with respect to an angle, the depth of the grooves, or the application of the wall.

To the configurations of Embodiments 1 to 4, a change in the depth or width of at least one of the first-end circular groove and the second-end circular groove described in Embodiment 5 can be applied.

To the configuration of Embodiment 5 in which any reverse spiral groove is not provided, a choice between the singular number and the plural number of spiral grooves described in the other embodiments, the depth of the groove, the application of the wall, or a change in the spiral groove angle can be applied.

As long as friction strength in the axial direction is secured, only one of the first-end circular groove and the second-end circular groove may be provided, and furthermore, the width and depth of the provided circular groove, that is, the first-end circular groove or the second-end circular groove, can be changed in consideration of a required friction strength.

The configuration in which both ends in the axial direction of the plastic magnet in the integrated state are positioned outside at least one of the first-end circular groove and the second-end circular groove that constitute a knurled portion can be applied to all the embodiments.

Outline of Embodiments

A motor shaft according to one aspect of the present disclosure has a cylindrical shape and forms a rotational axis of a motor. The motor shaft includes a processing target region, a spiral groove, and a reverse spiral groove that intersects with the spiral groove at at least one point. The processing target region is provided from a first end on the bottom face side of the cylindrical shape to a second end on the top face side of the cylindrical shape. At least one turn of the spiral groove surrounds the outer circumferential surface in the processing target region. The reverse spiral groove surrounds the processing target region in a direction reverse to that of the spiral groove.

A motor shaft according to another aspect of the present disclosure includes a processing target region, a spiral groove, a first-end circular groove, and a second-end circular groove. The processing target region is provided from a first end on the bottom face side of the cylindrical shape to a second end on the top face side of the cylindrical shape. At least one turn of the spiral groove is provided between the first end and the second end so as to surround the outer circumferential surface of the cylindrical shape. The first-end circular groove is provided at the first end and surrounds the outer circumferential surface. The second-end circular groove is provided at the second end and surrounds the outer circumferential surface.

Thus, a shape can be created not by rolling processing, but by cutting processing, and therefore, equipment for the rolling processing is unnecessary, and, no step is added, so that productivity is enhanced.

Note that both the first-end circular groove and the second-end circular groove are not necessarily provided, but only one of them may be provided.

The motor shaft may be configured such that the spiral groove comprises a plurality of spiral grooves.

Thus, a groove area can be increased without changing the processing width of a spiral groove and without making larger the angle of the spiral groove with respect to the axial direction. Thus, processing time is not increased, and the angle of the spiral groove with respect to the axial direction is not made larger, whereby holding power in the axial rotational direction is not decreased, and, with an increase in the groove area, holding power in the axial horizontal direction and holding power in the axial rotational direction increase.

The motor shaft may be configured such that the spiral groove has a V-shaped bottom, the bottom being closest to the center of the circle of the cylindrical shape.

With this configuration, the effects of relaxing the edge shape of an intersecting portion of the spiral groove and reducing the generation of a burr and cutting refuse are achieved.

The motor shaft may be configured such that the spiral groove is a cut groove having an uppermost portion, the uppermost portion being radially most distant from the center of the circle of the cylindrical shape and being in agreement with the outer circumferential surface. The motor shaft may be configured such that the depth of the spiral groove is shorter than the width of the spiral groove.

With this configuration, the effects of enhancing the holding strength (adhesion strength) in the shaft-circumferential surface direction of a magnet formed at a portion of the spiral groove and increasing holding power in the axial horizontal direction and holding power in the axial rotational direction are achieved.

The motor shaft may be configured such that the spiral groove is inclined at 45 degrees with respect to the rotational axis.

Alternatively, the motor shaft may be configured such that the spiral groove is inclined at 45 degrees or more with respect to the rotational axis.

Alternatively, the motor shaft may be configured such that the spiral groove is inclined at 45 degrees or less with respect to the rotational axis.

With this configuration, when stress in the rotational direction or stress in the axial direction is imposed on the rotor, the stress is distributed equally in the groove direction and the groove vertical direction, so that the balance of holding power in the axial horizontal direction and holding power in the axial rotational direction can be kept.

The motor shaft may be configured such that the spiral groove includes a wall configured to fill the spiral groove at predetermined spacings, the wall having an uppermost portion, the uppermost portion being radially most distant from the center of the circle of the cylindrical shape and being in agreement with the outer circumferential surface.

With this configuration, when stress in the rotational direction or stress in the axial direction is imposed on the rotor, the stress in the groove direction can be held, and a processed area is reduced. Accordingly, holding power in the axial rotational direction increases. Furthermore, the effects of reducing processing time and making longer the life of a cutter are achieved.

The motor shaft may be configured such that the spiral groove is continuous with the first-end circular groove and the second-end circular groove.

With this configuration, a processing range for a knurled portion is determined.

The motor shaft may be configured such that at least one of the first-end circular groove and the second-end circular groove has a groove width wider than the width of the spiral groove.

The motor shaft may be configured to include a circular groove configured to be connected to a retaining ring used for the fixation of a bearing, and may be configured such that at least one of the first-end circular groove and the second-end circular groove has a groove width wider than the width of the circular groove.

With this configuration, mechanical strength, in the axial direction of the motor shaft, of the plastic magnet integrally molded with the motor shaft is increased, whereby holding power in the horizontal direction and the rotational direction of of the rotational axis is increased.

INDUSTRIAL APPLICABILITY

The motor shaft according to the present disclosure is not subjected to rolling processing, and is provided with a spiral groove to hold a plastic magnet. Therefore, equipment of the rolling processing is not required, and any step is not added, so that a productivity increase can be expected. A motor including the motor shaft according to the present disclosure can be applied to motors for driving, for example, a ventilation fan.

REFERENCE MARKS IN THE DRAWINGS

1 . . . motor
2 . . . molded body
3 . . . stator
4 . . . winding
5 . . . bearing
6 . . . bracket
7 . . . rotor
8 . . . plastic magnet
9, 9b, 9c, 9d, 9e, 9f, 9g, 9h . . . motor shaft
10, 10b, 10c, 10d, 10e, 10f, 10g, 10h . . . spiral groove
11, 11b, 11c, 11d, 11e, 11f . . . reverse spiral groove
12 . . . circular groove
12a . . . first-end circular groove
12b . . . second-end circular groove
13 . . . rotating axis
14 . . . spiral groove angle
20 . . . bottom face
21 . . . top face
22 . . . notch
23 . . . processing target region
24 . . . imaginary line
A-A . . . cutting line
30 . . . groove center
31a . . . left inner wall
31b right inner wall
32, 32a, 32b . . . uppermost portion 33 . . . outer circumferential surface
34 . . . groove depth
35 . . . groove width
41 . . . reverse spiral groove angle
42 . . . rotational direction
43 . . . axial direction
44 . . . groove direction
45 . . . groove vertical direction
51 . . . wall
101 . . . motor shaft
102 . . . diamond knurled portion
103 . . . parallel lines-patterned knurled portion
111 . . . processed groove
112 . . . outer circumferential surface
113 . . . projection

The invention claimed is:

1. A motor shaft that has a cylindrical shape and forms a rotational axis of a motor, the motor shaft comprising:
   a processing target region having a first end closer to a bottom face of the cylindrical shape and a second end closer to a top face of the cylindrical shape;
   a spiral groove at least one turn of which surrounds an outer circumferential surface in the processing target region;
   a reverse spiral groove surrounding the outer circumferential surface in the processing target region in a direction reverse to a direction of the spiral groove, the reverse spiral groove intersecting with the spiral groove at at least one point;
   a first-end circular groove surrounding the outer circumferential surface at the first end;
   a second-end circular groove surrounding the outer circumferential surface at the second end; and
   a circular groove configured to be connected to a retaining ring used for fixation of a bearing,
   wherein at least one of the first-end circular groove and the second-end circular groove has a groove width longer than a width of the circular groove.

2. A motor shaft that has a cylindrical shape and forms a rotational axis of a motor, the motor shaft comprising:
   a processing target region having a first end closer to a bottom face of the cylindrical shape and a second end closer to a top face of the cylindrical shape;
   a spiral groove at least one turn of which surrounds an outer circumferential surface of the cylindrical shape between the first end and the second end;
   a first-end circular groove and a second-end circular groove, the first-end circular groove being provided at the first end and surrounding the outer circumferential surface, the second-end circular groove being provided at the second end and surrounding the outer circumferential surface; and
   a circular groove configured to be connected to a retaining ring used for fixation of a bearing,
   wherein at least one of the first-end circular groove and the second-end circular groove has a groove width longer than a width of the circular groove.

3. The motor shaft according to claim 1,
   wherein the spiral groove comprises a plurality of spiral grooves.

4. The motor shaft according to claim 1,
   wherein an inner wall of the spiral groove has a bottom, the bottom being closest to a center of a circle of the cylindrical shape and being V-shaped.

5. The motor shaft according to claim 1,
   wherein the spiral groove is a cut groove having an uppermost portion, the uppermost portion being radially most distant from a center of a circle of the cylindrical shape and being in agreement with the outer circumferential surface.

6. The motor shaft according to claim 1,
   wherein the spiral groove has a groove depth shorter than a groove width.

7. The motor shaft according to claim 1,
   wherein the spiral groove is inclined at 45 degrees with respect to the rotational axis.

8. The motor shaft according to claim 1,
   wherein the spiral groove is inclined at 45 degrees or more with respect to the rotational axis.

9. The motor shaft according to claim 1,
   wherein the spiral groove is inclined at less than 45 degrees with respect to the rotational axis.

10. The motor shaft according to claim 1, wherein
    the spiral groove includes a wall configured to fill the spiral groove at predetermined spacings, and
    the wall has an uppermost portion, the uppermost portion being radially most distant from a center of a circle of the cylindrical shape and being in agreement with the outer circumferential surface.

11. The motor shaft according to claim 1,
    wherein the spiral groove is continuous with the first-end circular groove and the second-end circular groove.

12. The motor shaft according to claim 1,
    wherein at least one of the first-end circular groove and the second-end circular groove has a groove width longer than a width of the spiral groove.

13. A rotor, comprising:
    the motor shaft according to claim 1; and
    a plastic magnet fixed to the processing target region of the motor shaft.

14. A motor, including the rotor according to claim 13.

15. A blower, including the motor according to claim 14.

* * * * *